United States Patent [19]

Schuddemat et al.

[11] 4,373,386
[45] Feb. 15, 1983

[54] DIRECTION SENSITIVE FLOW VELOCITY METER AND SENSING PLATE TO BE USED ON IT

[75] Inventors: Jacob P. Schuddemat, Huizen; Johan H. Huijsing, Den Hoorn, both of Netherlands

[73] Assignee: Brooks Instrument B.V., Veenendaal, Netherlands

[21] Appl. No.: 165,608

[22] Filed: Jul. 3, 1980

[30] Foreign Application Priority Data

Jul. 9, 1979 [NL] Netherlands ............................ 7905356

[51] Int. Cl.³ ............................ G01F 1/68; G01P 5/10
[52] U.S. Cl. .......................................... 73/189; 73/204
[58] Field of Search ............................ 73/188, 189, 204

[56] References Cited

U.S. PATENT DOCUMENTS

| | | |
|---|---|---|
| 1,996,943 | 4/1935 | Wile . |
| 2,255,771 | 9/1941 | Golay ........................................ 73/189 |
| 2,496,339 | 2/1950 | De Giers et al. ........................ 73/188 |
| 2,546,822 | 2/1951 | Hastings . |
| 2,647,401 | 8/1953 | Hathaway ............................... 73/204 |
| 2,745,283 | 5/1956 | Hastings . |
| 2,786,354 | 3/1957 | Martin et al. ........................... 73/204 |
| 3,030,806 | 4/1962 | Davis . |
| 3,075,515 | 1/1963 | Richards ............................ 73/204 X |
| 3,592,055 | 7/1971 | Dorman ................................. 73/188 |
| 3,732,729 | 5/1973 | Greene .................................. 73/204 |
| 3,945,855 | 3/1976 | Skrabeit . |
| 3,996,799 | 12/1976 | Van Putten . |

FOREIGN PATENT DOCUMENTS

| | | |
|---|---|---|
| 7609696 | 3/1978 | Netherlands ........................... 73/204 |
| 601298 | 5/1948 | United Kingdom . |
| 729180 | 5/1955 | United Kingdom . |
| 767569 | 2/1957 | United Kingdom . |
| 1072514 | 6/1967 | United Kingdom . |
| 1095476 | 12/1967 | United Kingdom . |
| 1116178 | 6/1968 | United Kingdom . |
| 1230638 | 5/1971 | United Kingdom . |

*Primary Examiner*—Herbert Goldstein
*Attorney, Agent, or Firm*—Polster, Polster and Lucchesi

[57] ABSTRACT

In a direction sensitive flow velocity meter for a gas or a liquid, including a sensing plate having a sensor part and a heat generating element, and an electronic circuit for processing the electric signals furnished by the sensor part, the sensor part comprises at least one Seebeck detector.

8 Claims, 5 Drawing Figures

DIRECTION SENSITIVE FLOW VELOCITY METER AND SENSING PLATE TO BE USED ON IT

BACKGROUND OF THE INVENTION

The invention relates to a direction sensitive flow velocity meter for a fluid, either a gas or a liquid, comprising a sensing plate with a sensor part and with devices for generating heat, and electronic means for converting the electric signals furnished by the sensor part. The invention likewise relates to a sensing plate to be used in such a flow velocity meter.

A similar flow velocity meter is known from Dutch patent application No. 7609696. The known velocity meter contains as sensing plate a chip on which the sensor part and a signal converting part are integrated. The sensor part in this device consists of two or more temperature sensitive transistors, of which, seen in the flow direction, at least one is situated upstream and at least one is situated downstream on the chip. When the chip is heated, the flowing fluid, which first meets the upstream transistor or transistors on the chip, will be heated when flowing along the chip and will in turn cause the downstream transistor or transistors on the chip to attain a higher temperature than the upstream transistor or transistors. This causes a difference in output signal between the upstream and the downstream transistors. This difference in output signal is an indication of the flow velocity.

Although satisfactory results are achieved with the known meter, there are some inherent problems. The measuring transistors exhibit, as do all transistors, a drift phenomenon, that is to say, that with time the output signal produced by the temperature sensitive transistors at a certain temperature difference between the upstream and downstream edges of the chip can vary. It is true that the phenomenon is such that only very slight temperature differences, in the order of hundredths of degrees seem to be at issue, but at flow velocity measurements in slowly moving fluids such a deviation may already be in the order of magnitude of the measurement itself. Obviously it is possible to periodically re-calibrate the meter, at least to compensate for the drift phenomena, but in a number of cases, for instance in the chemical process industry, it is undesirable once it has been installed, to dismantle a meter for some time to re-calibrate it.

One of the the objects of this invention is to offer a solution for the problem indicated by providing a flow velocity meter in which there are no time-related drift phenomena in the sensor part or in which such drift phenomena have no noticeable effect.

BRIEF SUMMARY OF THE INVENTION

According to this invention, generally stated, the objective is achieved with a flow velocity meter in which the sensor part consists of at least one Seebeck detector. A Seebeck detector is a detector in which use is made of the so-called Seebeck phenomenon. If a conductive strip is electrically connected at its two ends with two strips of another conductive material and the places of connection are held at different temperatures among them, an electro-motive force is generated. At the ends of the two strips of another material a small voltage difference can be ascertained. In reverse, from the presence of a small voltage difference a small temperature difference can be ascertained. In the flow meter, according to the invention, a sensing plate with a Seebeck element is placed in the fluid stream. The one end of the Seebeck sensor is situated in this configuration at that end of the sensing plate where the fluid stream arrives at the plate. The other end is situated downstream at the other end of the plate. Between these two ends of the plate and between the two ends of the sensor, is the heating element. When the heating element or elements is energized the plate will be heated above the temperature of the fluid. The flowing fluid, first meeting the one end of the Seebeck detector on the upstream end of the sensing plate, will cool the upstream end of the sensing plate. The flowing fluid itself will be heated when flowing along the plate. When the flow arrives at the other end of the Seebeck detector at the downstream end of the sensing plate, this end will be cooled less by the heated fluid than the upstream end, so that the temperature of the downstream detector will be higher than that of the upstream detector. Thus, between the ends of the detector a voltage differential can be measured. The magnitude of this voltage differential is a measure of the flow velocity of the fluid.

An advantage of applying a Seebeck detector as sensor is that such a detector is essentially a passive component. It is a voltage device, not a current device, so drift phenomena are minimized.

The sensing plate applied in the flow velocity meter according to the invention, can in a suitable manner comprise an integrated circuit with at least one Seebeck detector and one or more heating elements. Preferably, the integrated circuit contains at the same time parts of the means for converting the signals furnished by the Seebeck detector or detectors.

With another form of construction of the sensing plate for the flow velocity meter according to the invention, the sensing plate comprises a plate of a ceramic material, on which at least one Seebeck detector has been mounted and on which or in which one or more heating elements are provided. This construction can be referred to as "hybrid."

In the case of a sensing plate consisting of an integrated circuit, a plate of silicon may be applied. The Seebeck detector in such a semi-conductor plate can, for instance, consist of an N-type doped interconnection layer in the plate and electrically separated from this a P-type doped interconnection layer at some distance from the N-type interconnection layer, wherein contact layers of an electrically conductive metal, for instance, aluminum, have been applied to the ends of the respective interconnection layers. The metal to semi-conductor junctions form the transitions of the Seebeck detector generating a small voltage at a temperature difference. The voltage at the junction of the metal and the end of the N-type interconnection layer is the opposite of that at the junction of the metal and the same end of the P-type interconnection layer, so that when the opposite ends of the N-type interconnection layer and of the P-type interconnection layer are connected by a metal contact layer, the voltage differential between the metal layers at the metal semi-conductor transitions at the other ends will be the sum of the voltage differentials for each interconnection layer separately.

It will be clear that instead of heating the fluid flow, which moves alongside the sensing plate, cooling of it can be applied as well. Also in that case there will be a temperature difference between the two ends of the Seebeck detector, so that a voltage differential can be measured, which voltage differential is again a measure of the flow velocity.

The heating of the fluid flowing alongside the sensing plate can be done in different ways. A possibility is heating with the aid of radiation from outside. Preferably, however, the sensing plate comprises a resistor or power transistor through which the desired energy can be applied for generating heat. If the sensing plate comprises an integrated circuit, the resistor or power transistor can be part of the integrated circuit. It is also possible that the integrated components in the circuit for further converting of the signals serve as a heat source. When applying the so-called hybrid approach the heat generating resistor can be attached to the ceramic plate, for instance.

In the flow velocity meter according to the invention, the flow velocity is ascertained from the difference in temperature between upstream and downstream ends of the sensing plate, which difference in temperature is determined with the aid of a Seebeck detector or detectors. If the flow direction is reversed, the signal of the Seebeck detector becomes opposite. Thus the Seebeck detector also provides flow direction information. In fact the Seebeck detector gives information about the flow component parallel to the line between the contact places of the detector. By applying two sensing plates on which the Seebeck detectors are placed in a plane at a given angle (preferably 90 degrees) the flow direction in that plane can be determined accurately.

DESCRIPTION OF THE PREFERRED EMBODIMENT

Figure 1:
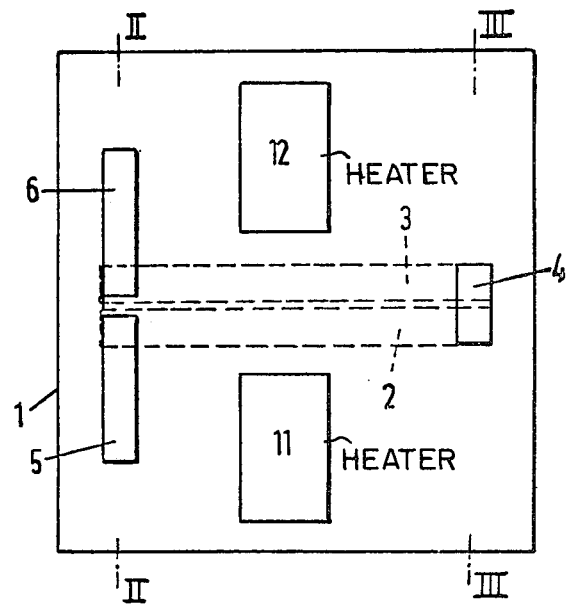
FIG. 1 is a schematic diagram in top view of a form of construction of a sensing plate for a flow velocity meter according to the invention.
Figure 2:
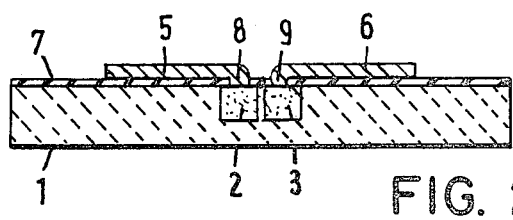
FIG. 2 is a sectional view through the sensing plate in FIG. 1, taken along the line 11—11.
Figure 3:
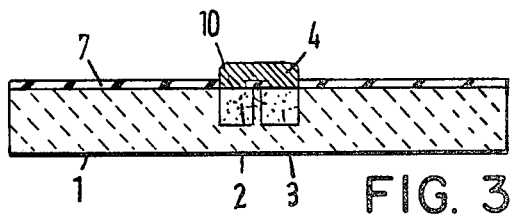
FIG. 3 is a similar section, taken along the line 111—111.

Referring now to the drawing for one illustrative embodiment of this invention, in FIG. 1 a form of construction of a sensing plate for a flow velocity meter according to the invention has been pictured schematically. In this mode of execution, the sensing plate has the shape of a semi-conductor plate 1 of, for instance, silicon, on which a Seebeck detector has been integrated. The Seebeck detector essentially comprises two strips of dissimilar semi-conductor material situated in close proximity on the semi-conductor plate. In this illustrative embodiment a first strip 2 is of N-type and a strip 3 of P-type. The strips can be obtained by means of suitable mask and diffusion operations on the semi-conductor plate 1. The strips are connected to each other at one end by a contact layer 4 of a suitable metal, in this case, aluminum. At the other ends of the strips 2 and 3 contact layers 5 and 6 do not touch each other, as shown in FIG. 2, which depicts a sectional view of FIG. 1 along the line 11—11. On the plate 1, in which the strips 2 and 3 have been formed, there is an isolation layer 7, in this example, of silicon-dioxide. In the isolation layer 7, windows 8 and 9 have been formed respectively above the strips 2 and 3. Through the windows 8 and 9 the respective contact layers 5 and 6 form junctions with strips 2 and 3, respectively. The contact layers 5 and 6 are separated from each other by a part of the isolating and passivating layer 7. FIG. 3 is a sectional view of FIG. 1 along the line 111—111. In the isolating layer 7 windows 10 have been formed above the ends of the strips 2 and 3 through which those ends lie open. In the windows and across the part of the isolating layer 7 lying between them, the contact layer 4 has been applied.

If the temperature of the semi-conductor plate 1 at the location at one end of the strips 2 and 3 differs from the temperature at the opposite ends, there is a small voltage differential between the contact layers 4 and 6 and between the contact layers 4 and 5, due to the Seebeck effect. The voltage differential between the contact layers 4 and 5 is the opposite of that between the layers 4 and 6. Between the contact layers 5 and 6 a voltage differential can thus be measured, equal to the sum of the differentials between the aforementioned pairs of contact layers. This voltage differential is a measure of the temperature difference.

Heating elements have been integrated in the plate 1, which are indicated by the blocks 11 and 12. Such elements are, in this illustrative embodiment, integrated resistors in the plate. The exact location of the elements 11 and 12 is not critical as long as they are situated somewhere between the front and the rear of the plate 1. If heat is developed in the elements 11 and 21, this heat will spread through the plate. When during operation a fluid flow passes alongside the plate, for instance in a direction parallel to the strips 2 and 3 from the end of the plate where contact layers 5 and 6 are located to the end where contact layer 4 is located, the fluid therefore is warmed and will cool to a lesser extent the end of the plate downstream of elements 11 and 12. That end of plate 1 where the ends of the strips 2 and 3 are joined by contact layer 4 therefore is at a higher temperature than the end of the plate 1 where the ends of the strips 2 and 3 join contact layers 5 and 6 respectively. The temperature difference depends on the nature and the temperature of the flowing fluid, the quantity of heat developed in the elements 11 and 12, i.e., the temperature of the plate 1, and the flow velocity of the fluid. The first two quantities can be determined, after which the last mentioned can be calculated. With the aid of suitable electronics and measuring sensors, fully compensated flow measurement can be realized. The temperature of the plate can be measured by a separate temperature sensor integrated in the plate. If the elements 11 and 12 have the characteristics of temperature dependent transistors, then the elements 11 and 12 can also serve as temperature sensors. It is also understood that the power to the heating elements 11 and 12 is a measure of the flow velocity of the fluid, but direction sensitivity is absent.

Figure 4:
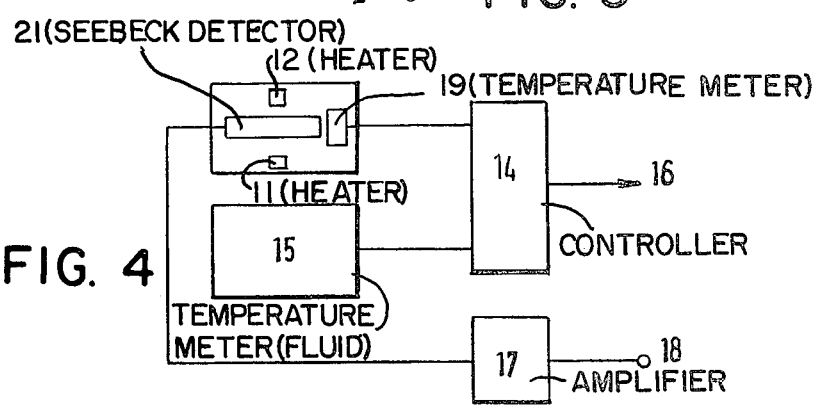
FIG. 4 is a diagrammatic view of the flow velocity meter according to the invention.

A schematic for a form of construction for the flow velocity meter according to this invention is given in FIG. 4. The sensing plate 13 has the shape as pictured in FIGS. 1, 2 and 3 and contains a Seebeck detector 21. The sensing plate preferably also contains a temperature sensor 19 to actively measure the temperature of the sensing plate. The sensing plate temperature information is transmitted to the controller 14. This controller 14 simultaneously receives temperature information of the flowing fluid from the temperature sensor 15, which has been placed in the fluid flow stream. It is desirable to maintain a constant temperature difference between the sensing plate with Seebeck detector and the fluid. If this temperature difference varies, the value measured by the Seebeck detector will also vary for a given fluid velocity. This variation may be compensated but it is simpler to keep the temperature difference constant, which is accomplished by the controller 14. From the temperature information furnished to the controller 14 it is determined by the controller 14 whether more or less heat must be developed by the elements of the sensing plate 13. A connection between the controller 14 and the heating elements has schematically been indicated by the arrow 16 in FIG. 4. The controller 14 is a suitable instrument for the purpose such as a proportioning differential controller. Those skilled in the art will be able to determine from the above description how the controller should be constructed.

When the temperature difference between fluid and sensing plate is held constant in the aforementioned manner, the signal from the Seebeck detector or detectors present on the sensing plate is already a direct measure of the flow velocity of the fluid. The signal that contains this flow information is fed to a low drift dc current amplifier 17. The output signal from this amplifier 17 is taken from connector 18 for further processing.

When utilizing an integrated circuit sensing plate as the device schematically shown in FIG. 4, this sensing plate can also contain parts of the controller 14 and of the amplifier 17, as part of the integrated circuit on the plate.

Figure 5:
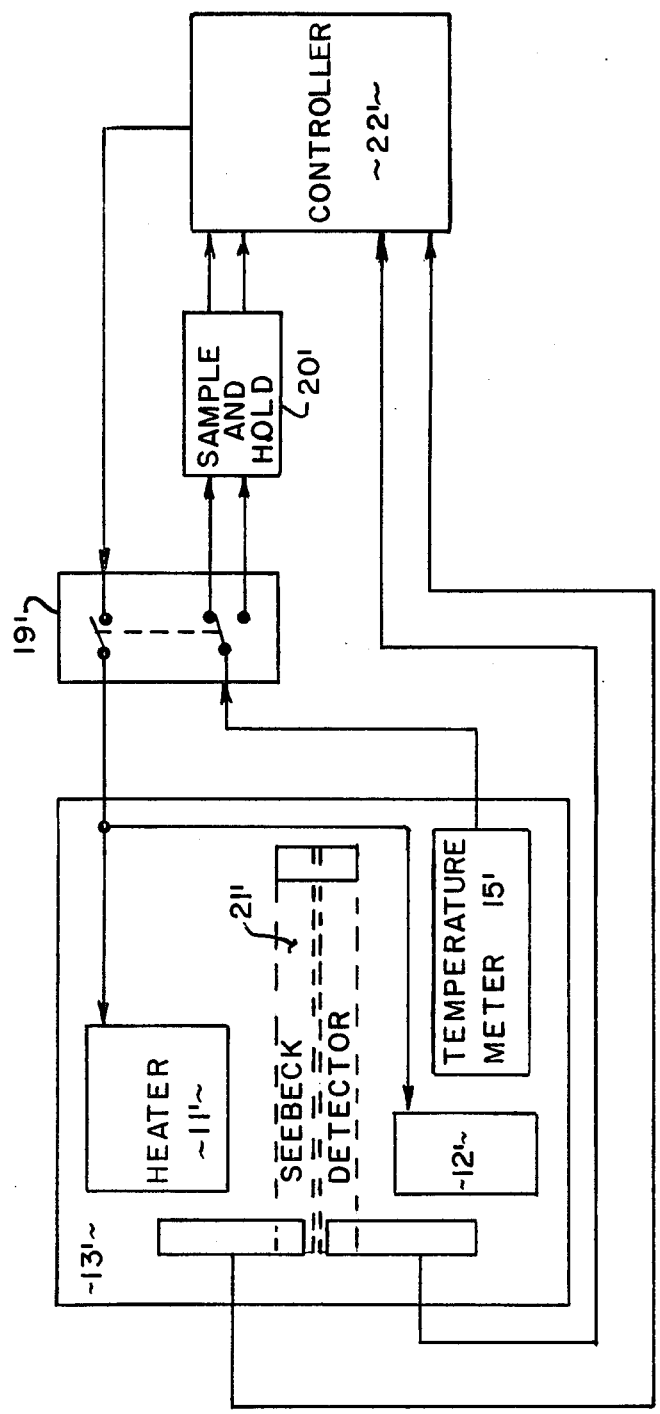
FIG. 5 is a diagrammatic view of another form of construction of a flow velocity meter according to the invention.

With the aid of the device described from FIG. 4 the value of the flow velocity of a fluid can be continuously measured as a function of the output signals from the Seebeck detector. As shown in FIGS. 1–4, the temperature meter 15, which measures the temperature of the fluid and passes it on to the controller 14, is situated outside the sensing plate 13. As shown in FIG. 5, it is also possible, however, that the temperature meter 15' be integrated onto the sensing plate 13'. In that case the temperature of the fluid and the flow velocity are sequentially measured. During the time when the fluid temperature is measured, the heating elements 11' and 12' that heat the plate 13' are de-energized by a switching circuit 19' will have the temperature of the medium. With such a mode of construction provisions must be made in the electronic processing of the signals, so that during the time that the temperature information related to the flow information is not being read directly, these data are held available electronically, for instance with the help of a so-called "sample-and-hold" circuitry 20'. Both in this way and in the form of construction with a separate temperature meter the electronic parts can be controlled by a micro processor 22'. A measuring cycle for a flow measurement with the variant with temperature meter 15' integrated in the plate 13' is for instance as follows: First, the temperature of the flowing fluid is determined with switched off heating elements 11' and 12'. This temperature information is stored in an electronic memory (sample and hold circuit) 20'. Then the temperature of the sensing plate 13' is raised a certain number of degrees above the fluid temperature by means of the heating elements 11' and 12' regulated by the controller or processor 20'. With the aid of the Seebeck detector 21', the temperature difference between upstream and downstream side of the sensing plate caused by the fluid flow, is determined and from this the flow velocity of the fluid is determined. The information obtained is stored in an electronic memory and the heating elements 11' and 12' are switched off. The sensing plate then cools down to the fluid temperature after which the cycle is repeated. The thermal mass of an integrated circuit is so small that the cooling takes place very fast. A complete measuring cycle can therefore take place in a fraction of a second.

Having thus described the invention, what is claimed and desired to be secured by Letters Patent is:

1. In a direction sensitive flow velocity meter for a fluid, including a sensing plate in thermal contact with the fluid, said sensing plate having a sensor part for producing electrical signals responsive to differences in temperature in said fluid and means for generating heat to produce a temperature differential in said fluid, and electronic means for processing the electric signals furnished by the sensor part to produce a signal indicative of the flow of the fluid, the improvement wherein said sensing plate comprises an integrated circuit, wherein said sensor part comprises at least one Seebeck detector integrated in said integrated circuit, and wherein said means for generating heat comprise one or more heating elements integrated in said integrated circuit.

2. The improvement of claim 1 wherein the Seebeck detector consists of two strips on the plate lying close to each other, one of said strips being formed of a p-type semiconductor material and the other of said strips being formed of an n-type semiconductor material, of which strips the ends on one side have been connected by a metal contact layer and of which strips the ends at the side lying opposite have been provided with separate contact layers.

3. The improvement of claim 1 or 2, wherein the integrated circuit contains parts of the means for processing the signals furnished by the Seebeck detector.

4. The improvement of claim 1 further including fluid temperature measuring means, means for sensing the temperature of said sensing plate, and temperature controller means connected to said fluid temperature sensing means and to said means for sensing the temperature of said sensing plate for controlling the means for generating heat, to maintain a substantially constant differential between the fluid and the sensing plate.

5. The improvement of claim 4 wherein said fluid temperature measuring means and said means for sensing the temperature of said sensing plate comprise a temperature sensor on said plate and switching and sample-and-hold means electrically connected to said temperature sensor, said switching means being connected to said temperature controller means for alternately energizing and de-energizing said heating means to produce a heating cycle and a cooling cycle, and comparing the temperature of said fluid during said cooling cycle with the temperature of said plate during the heating cycle.

6. The improvement of claim 4 wherein said means for generating heat comprise temperature sensitive transistors, said transistors serving also as said means for sensing the temperature of said plate.

7. In a direction sensitive flow velocity meter for a fluid, said meter including heating means for producing a temperature differential in said fluid, sensor means in thermal contact with the fluid for producing electrical signals responsive to differences in temperature in said fluid, and electronic means for processing the electric signals furnished by the sensor means to produce a signal indicative of the flow of the fluid, the improvement wherein said sensor means comprise at least one Seebeck detector, said Seebeck detector comprising two strips of different material lying close to each other, of which strips the ends on one side are connected by a contact material different from the material of each of said strips, and of which strips the ends at the side lying opposite are separately connected to said electronic means.

8. The improvement of claim 7 wherein one of said strips is formed of a p-type semiconductor material and the other of said strips is formed of an n-type semiconductor material.

* * * * *